United States Patent [19]

Dyck et al.

[11] Patent Number: 5,924,454
[45] Date of Patent: Jul. 20, 1999

[54] ISOLATION TOOL

[75] Inventors: John Dyck; Horst Gotowik; Gerald B. Flatekval, all of Edmonton, Canada

[73] Assignee: Canadian Fracmaster Ltd., Canada

[21] Appl. No.: 08/593,021

[22] Filed: Jan. 29, 1996

Related U.S. Application Data

[51] Int. Cl.⁶ .................................................. F16L 55/11
[52] U.S. Cl. ............................................. 138/89; 138/90
[58] Field of Search ........................................ 138/89, 90

[56] References Cited

U.S. PATENT DOCUMENTS

| | | |
|---|---|---|
| 3,593,749 | 7/1971 | Reardon . |
| 4,314,577 | 2/1982 | Brister ......................................... 138/90 |
| 4,422,477 | 12/1983 | Wittman et al. . |
| 4,465,104 | 8/1984 | Wittman et al. ........................... 138/89 |
| 4,854,384 | 8/1989 | Campbell . |
| 5,293,905 | 3/1994 | Friedrich . |

FOREIGN PATENT DOCUMENTS

| | | |
|---|---|---|
| 1292704 | 4/1987 | Canada . |
| 2042338 | 5/1991 | Canada . |
| 1273726 | 5/1972 | United Kingdom . |

OTHER PUBLICATIONS

Hal Anderson, Tom Walls and Jim McLaws "Pipeline cut–outs using remote–controlled packers," Nowsco Pipeline Surveys & Services, Pipeline Pigging and Inspection Technology Conference, Houston, Texas, Feb. 17–20, 1992; pp. 1–20.

*Primary Examiner*—Denise L. Ferensic
*Assistant Examiner*—James F. Hook
*Attorney, Agent, or Firm*—Lerner, David, Littenberg, Krumholz & Mentlik, LLP

[57] ABSTRACT

There is described an improved pipeline isolation tool for plugging a pipeline at a predetermined location, comprising a housing adapted for movement through a pipeline, the housing having first and second ends, seals disposed annularly about the housing, the seals being radially expandable into fluid sealing contact with an inner wall of the pipeline, and a plurality of braking members including grips for frictionally engaging the inner wall of said pipeline to lock the isolation tool in position against fluid pressure in the pipeline, the braking members being selectively and repetitively movable between a first position in which the grips are disengaged from the inner pipeline wall and a second position in which the grips engage the inner wall.

47 Claims, 5 Drawing Sheets

ISOLATION TOOL

FIELD OF THE INVENTION present invention relates to a pipeline isolation tool and more particularly to a pipeline packer insertable into a pipeline for plugging or sealing the pipeline at a predetermined location.

BACKGROUND OF THE INVENTION

Pipeline packers are designed for injection into the pipeline through a launching tube, either as a single tool or in pairs, for the purpose of isolating predetermined sections of pipe for repair or replacement or a valve or other equipment in the isolated zone. The packer is propelled to the designated location using the flow of product in the line with the packer being tracked from above the ground using known techniques. Upon reaching the desired location, fluid flow in the line is terminated and the packer is activated by a signal from the operator on the surface to form a seal against the inner pipeline wall. Once the packer is properly set, the section of pipeline downstream of the lock-up needing repair or replacement is isolated by means of a second packer or a block valve. Pressure in the isolated section of line is relieved and the product therein removed to create a proper working environment without having to drain or depressurize the adjacent sections of pipeline.

When the portion of pipeline to be repaired is completely drained, that portion can be physically removed for replacement. On completion of the repair, the operator will transmit another signal to release the packer which is then moved away by resuming the flow of pipeline product for removal from the pipeline through an adjacent launch tube or pig trap.

Packers are relatively well known in the prior art, and reference is made in this regard to U.S. Pat. Nos. 4,422,477, 4,854,384 and 5,293,904 as well as Canadian Patent 1,292,704 and Canadian laid-open patent Application No. 2,042,338. The latter reference is more specifically directed towards a pipeline pig which, as will be appreciated by those skilled in the art, is designed to fulfil a different purpose than a packer and functions quite differently.

Packers of the present sort generally comprise an expansible elastomeric seal to form a fluid-tight barrier against the inner pipeline wall. These seals alone are insufficient to lock the packer in position against the often extremely high fluid pressures exerted by the pipeline product. Hydraulic pressure is therefore used to drive a set of slips or brake shoes into gripping contact with the inner pipeline wall. The slips or brake shoes are typically wedge-activated so that the differential or delta pressure acting across the packer will actually increase the force exerted by the brake shoes on the pipeline wall to ensure an even stronger grip. It is vital that the packer be firmly locked in the pipeline. In the event of failure, the packer may be expelled at velocities more than sufficient to crush workers in the repair zone and to create the potential for an ecological disaster.

Although packer design has been improved substantially over the years, known tools still suffer major drawbacks. Most importantly, known tools can withstand product pressure from one side of the packer only and must therefore be properly oriented to form a seal against head pressure acting from the design direction. This limits versatility.

Existing tools moreover are designed to perform a single sealing operation and must then be withdrawn from the pipeline for valve replacement and/or power source recharge prior to reuse. For example, a commonly used power source is compressed nitrogen over hydraulic fluid stored in a separate accumulator. To set the tool, the hydraulic fluid is released to the head that sets the slips by means of valves opened using explosive charges. When the job is complete, another explosive valve is blown to exhaust the hydraulic fluid into the pipeline, thereby releasing the tool. The packer's power supply is now completely exhausted and the tool must be removed from the pipeline for recharge of the accumulator and replacement of the explosive valves. This is time consuming and expensive and highlights the need for a packer having true multiset capabilities.

Another drawback to existing packers is the inability to equalize pressure across the packer following completion of the pipeline repair and before release of the tool. Typically, prior to release of the packer, the repaired section of line is tapped for fluid reintroduction. The packer release valve is then blown using charges, the pipeline flow is resumed and the packers are removed at the next adjacent pig trap. The packers are then serviced and re-energized. It would be advantageous to provide a packer having a built-in bypass system actuatable to allow fluid flow through the packer itself for equalization of the pressure across the tool without having to perforate the repaired section.

SUMMARY OF THE INVENTION

It is therefore an object of the present invention to provide a pipeline packer that obviates and mitigates from the disadvantages of the prior art.

It is a further object of the present packer to provide a bi-directional tool having multiset capabilities.

Further features and advantages of the present invention will become evident from the detailed description following hereinafter.

According to the present invention then, there is provided a braking apparatus for locking a pipeline isolation tool used to plug a pipeline at a predetermined location against the pressure of fluid in the pipeline, said tool including a housing adapted for movement through the pipeline and for supporting the braking apparatus, comprising a plurality of gripping means disposed about the housing for frictionally engaging an inner surface of the pipeline to lock the tool in a predetermined location in the pipeline, support means to independently support at least respective ones of the gripping means so that first and second portions of the gripping means are axially spaced apart in the longitudinal direction of the housing, setting means actuatable for moving the support means between a first position wherein the gripping means are disengaged from the inner surface and a second position in which the gripping means engage the surface for locking of the tool in the predetermined location, and drive means for actuation of the setting means for selective movement of the gripping means between the first and second positions thereof.

According to another aspect of the present invention, there is provided a sealing system to prevent leakage of fluid around an isolation tool used to plug a pipeline at a predetermined location, the system comprising at least first and second resilient sealing members disposed annularly about the tool, the first and second members being axially spaced apart in the longitudinal direction of the tool and being radially expandable into fluid sealing contact with an inner surface of the pipeline, seal expanding means selectively actuatable to radially expand the sealing members into fluid sealing contact with the inner pipeline surface, and drive means for selective actuation of the seal expanding means.

According to yet another aspect of the present invention, there is also provided a pipeline isolation tool for plugging a pipeline at a predetermined location, the tool including a housing adapted for movement through the pipeline, sealing means disposed annularly about the housing and being expandable into fluid sealing contact with the pipeline inner wall and braking means adapted to frictionally engage the inner pipeline wall to hold the tool in a predetermined location against the pressure of fluid in the pipeline, the improvement comprising a fluid bypass, the bypass including a flow channel formed through the housing for the flow of pipeline fluid from one end of the housing to the other, valve means selectively actuatable to open and close the flow channel, and actuating means responsive to an input for selectively opening the valve to permit the flow of fluid and for closing of the valve to prevent the flow of fluid, wherein the bypass may be used to adjust or equalize the pressure of pipeline fluid acting across the housing.

In accordance with yet a further aspect of the present invention, there is also provided a pipeline isolation tool for plugging a pipeline at a predetermined location, the tool including a housing adapted for movement through the pipeline, sealing means disposed annularly about the housing and being expandable into fluid sealing contact with the pipeline inner wall and bracing means adapted to frictionally engage the inner pipeline wall to hold the tool in a predetermined location against the pressure of fluid in the pipeline, the improvement comprising an electro-mechanical drive system, the system comprising a threaded driven member rotatable in the clockwise and counter-clockwise directions about its longitudinal axis, a prime mover operatively connected to the driven member for rotation thereof, and means operatively associated with the driven member and threadedly connected thereto to move axially back and forth relative to the housing in response to clockwise and counter-clockwise rotation of the driven member, such that axial movement of the means in one direction actuates the sealing and braking means when the tool is to be held in a predetermined position thereof and axial movement of the means in the opposite direction releases the sealing and braking means so that the tool is movable relative to the pipeline, whereby the tool is adapted to plug the pipeline a plurality of times without having to withdraw the tool from the pipeline between said times.

In accordance with yet a further aspect of the present invention, there is also provided a pipeline isolation tool for plugging a pipeline at a predetermined location, comprising housing means adapted for movement through the pipeline, the housing having first and second ends, sealing means disposed annularly about the housing, the sealing means being radially expandable into fluid sealing contact with an inner wall of the pipeline, and a plurality of braking members, the braking members comprising a plurality of gripping means for frictionally engaging the inner wall of the pipeline to lock the isolation tool in the predetermined position thereof against fluid pressure in the pipeline, and support means to independently support at least respective ones of the gripping means so that first and second portions of the gripping means are axially spaced apart in the longitudinal direction of the housing the braking members being selectively and repetitively movable between a first position in which the gripping means are disengaged from the inner wall and a second position in which the gripping means engage the inner wall.

In accordance with yet a further aspect of the present invention, there is also provided a pipeline isolation tool for plugging a pipeline at a predetermined location, comprising housing means adapted for movement through the pipeline, the housing having first and second ends, sealing means comprising at least first and second resilient sealing members disposed annularly about the housing, the first and second members being axially spaced apart in the longitudinal direction of the housing and being radially expandable into fluid sealing contact with an inner surface of the pipeline, seal expanding means selectively actuatable to radially expand the sealing members into fluid sealing contact with the inner surface, braking means for locking the tool in the predetermined location, the braking means including a plurality of gripping means disposed about the housing for frictionally engaging the inner surface to lock the tool in the predetermined location, support means to independently support at least respective ones of the gripping means so that first and second sub groupings of the gripping means are axially spaced apart in the longitudinal direction of the housing and setting means actuatable for moving the support means between a first position wherein the gripping means are disengaged from the inner surface and a second position in which the gripping means engage the surface for locking of the tool in the predetermined location, and drive means for selective actuation of the setting means for movement of the gripping means between the first and second positions thereof and of the seal expanding means.

BRIEF DESCRIPTION OF THE DRAWINGS

Preferred embodiments of the present invention will now be described in greater detail and will be better understood when read in conjunction with the following drawings, in which.

DETAILED DESCRIPTION

Figure 1:
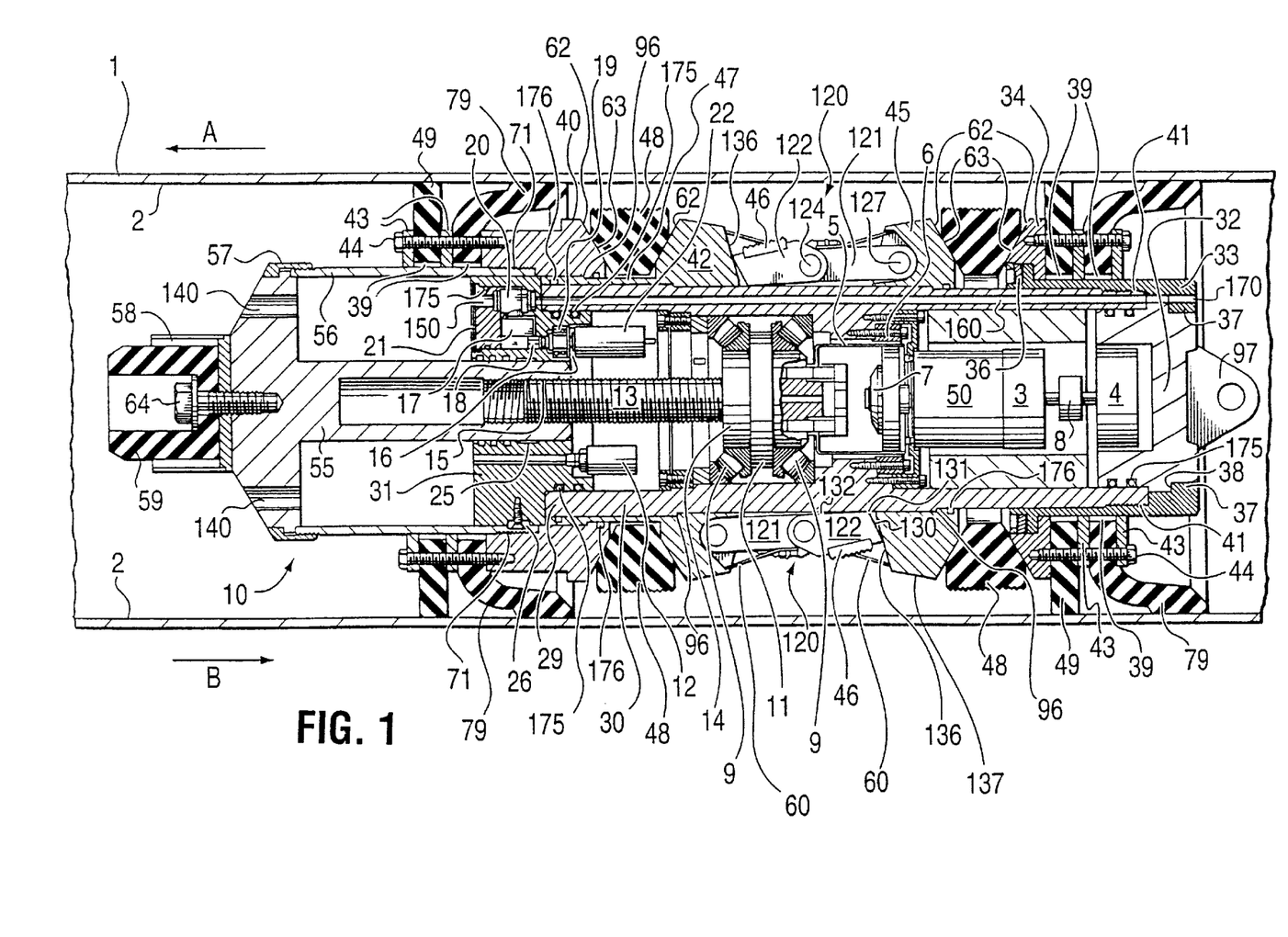
FIG. 1 is a side elevational cross-sectional view of the present packer.

With reference to FIG. 1, packer 10 is shown within a pipeline 1 in non-sealing, non-locked relation thereto. The packer is shown therefore in its transport mode for travel generally in the direction of arrow A after insertion of the tool through a launch tube or pig trap (not shown). It will be noted however that the present tool is intended to be somewhat bi-directional in nature and can travel in the opposite direction to a certain extent as might be required from time to time.

Generally, packer 10 comprises a main housing 30 which internally supports an electromechanical drive system 50 that will be described in greater detail below, and which also supports on its exterior the various seals, gripping brakes and sliders necessary to transport and set the packer in place to form a fixed fluid-tight plug in the pipeline.

Generally, housing 30 includes a compression sleeve 56 which, when driven in the direction of arrow B by drive 50 as will be described below, causes polyurethane sealing rings 48 to expand into fluid sealing contact with the pipeline's inner wall 2. At the same time, friction pads 46 on alternating oppositely directed pivotable locking arms 120 are moved radially outwardly into gripping contact with wall 2 for positive lock-up of the packer's position relative to the pipeline.

Unlike earlier packer designs which use electro-hydraulic drives, the present packer uses an electro-mechanical system 50 that facilitates its multiset capabilities as will be described below. Although the use of an electro-mechanical system in a packer is new, this type of drive is itself generally known, for example, in the aviation industry, and will therefore be described with reference to its main elements only. The remaining details will be apparent to those skilled in the art.

Motive power for the drive system is supplied by a 24 VDC gear motor 3 coupled to a harmonic drive set including a flex spline 5, a circular spline 6 and a wave generator 7 yielding a final 120:1 drive reduction to drive screw 13. Screw 13 is rotatably supported at its inner end 14 by thrust bearings 9. A separating disc 11 on end 14 sandwiched between horizontally opposite bearings 9 locates the screw axially relative to the drive mechanism. The outer opposite end 15 of the drive screw is externally acme threaded to engage an internally cooperatively threaded drive nut 55 that will move back and forth in the longitudinal direction of the housing guided by a compression sleeve 56. Sleeve 56 slidably engages the annular outer surface of a front end cap 31 connected to the upstream end 29 of housing 30. A guide insert 26 in cap 31 slidably engages sleeve 56 to prevent its rotation relative to the cap and housing. As will be obvious, rotation of drive screw 13 in one direction will result in movement of nut 55 and sleeve 56 in the direction of arrow B whereas rotation of the drive screw in the opposite direction will result in the nut and sleeve moving in the direction of arrow A. Nut 55 and sleeve 56 are connected together by means of a threaded locking collar 57.

The upstream end of housing 30 is completed with a bumper shell 58 and a polyurethane bumper 59 retained therein by means of a threaded fastener 64.

At the downstream end of housing 30, the unit is finished off with a rear end cap 32 and a cooperating rear collar 33 that threads to the housing at 41. Collar 33 includes a flange 37 to engage a shoulder 38 on cap 32 to hold the cap in place. Cap 32 includes a hitch 97 for connection to a battery module 200 that will be described in greater detail below.

Housing 30 is slidably supported within the pipeline by a spaced apart pair of polyurethane bidirectional disks 49 and an associated pair of polyurethane cup seals 79 disposed adjacent the opposite ends of the housing. The disks and cup seals provide a sufficient degree of sealing against inner pipe wall 2 that packer 10 can be moved to the repair zone by the flow of pipeline product.

The forwardmost disk/cup seal pair concentrically encircles compression sleeve 56 and is clamped to the housing by means of clamp rings 43 and threaded fasteners 44 which thread into front seal compression ring 40. Spacers 39 disposed between the clamp rings help prevent over tightening of fasteners 44 that could otherwise cause compressive distortion of the disk/cap pair.

The trailing disk/cup seal pair encircles rear collar 33, and are similarly clamped to the housing by means of clamp rings 43, spacers 39 and threaded fasteners 44 that thread into rear seal compression ring 34.

Front compression ring 40 is threadedly connected to compression sleeve 56 at 71. Compression ring 40 will therefore move back and forth in concert with the compression sleeve towards and away from a front lock ring 42 by sliding along the radially outer surface of an annular sleeve 47 extending axially forwardly from lock ring 42. As will be appreciated, as compression sleeve 56 is actuated to move in the direction of arrow B, front compression ring 40 is moved towards lock ring 42 with the result that wedging surfaces 62 on each of rings 40 and 42 cooperate with opposed wedging surfaces 63 on seal ring 48 to radially expand the sealing ring into fluid sealing contact with pipeline wall 2.

As compression sleeve 56 continues to retract, ring 42 will itself begin to slide in the direction of arrow B and this motion will eventually result in friction pads 46 being wedged into gripping contact with wall 2. More specifically, the locking assembly of the present packer comprises a plurality of longitudinally aligned, pivotable locking arms 120 deployed concentrically about housing 30 between front lock ring 42 and a rear lock ring 45. Each arm 120 consists of a link 121, a head 122, a wrist pin 124 pivotably connecting the head and link together and a replaceable friction pad 46 set into head 122. A pivot pin 127 connects each of arms 120 to one of lock rings 42 or 45 and the next adjacent arm to the other of rings 42 and 45 so that adjacent pairs of locking arms are oppositely aligned in the longitudinal direction of housing 30.

Each head 122 includes a wedging surface 130, a heel 131 and a lower wedging surface 132.

Rings 42 and 45 include, on those portions thereof aligned opposite heads 122, a first wedging surface 136 steeply angled at, for example, 60° to 75° to the housing's longitudinal axis, and a second wedging surface 137 more gently angled at, for example, 10° to the housing's longitudinal axis.

As ring 42 is forced towards ring 45, initially the head 122 and then the entire arm 120 will quickly ramp up wedging surface 136 to move friction pads 46 towards wall 2. As the heels 131 transition onto wedging surfaces 137, the movement of the pads towards wall 2 will be more gradual but the wedging force between the pads and the wall becomes substantial to form a positive lock-up with the pipeline wall sufficient to withstand the delta pressure across the tool. Because the oppositely aligned arms 120 ramp up in tandem, their motion tends to be self-levelling and self-balancing. Moreover, the differential or delta pressure acting across the packer from either the left or the right will actually increase the strength of the lock-up even in the event of drive failure. This, combined with the use of dual spaced apart sealing rings 48, gives the present tool the unique ability to hold fluid pressure from either its upstream or downstream ends.

As compression sleeve 56 continues to retract but prior to friction pads 46 gripping wall 2, the entire braking assembly including rear lock ring 45 will move in the direction of arrow B towards rear seal compression ring 34. in this way, wedging surfaces 62 on each of rings 45 and 34 cooperate with opposed wedging surfaces 63 on rear seal ring 48 to radially expand the rear seal into fluid sealing contact with inner wall 2.

Compression sleeve 56 is retracted until a complete lock-up is attained. Ring 34 includes a belleville spring 36 to provide some absorptive resiliency during full lock-up.

With the packer locked up, forward sealing ring 48 is closely contained on its one side by cup seal 79 and on its other by wedging surfaces 130 on adjacent locking assembly heads 122. Trailing ring 48 is similarly enclosed on the one side by the adjacent locking assembly heads and on the other by disk 49. This containment of seals 48 is intended to better prevent their extrusion in response to delta pressure.

To release the packer, gear motor 3 is reversed to cause withdrawal of compression sleeve 56. As will be appreciated, this causes rings 40, 42 and 45 to separate so that seal rings 48 contract to their normal size and friction pads 46 break contact with walls 2 with leaf springs 60 or a similar retracting mechanism assisting in the return of arms 120 to their original undeployed position as shown in FIG. 1. Annular shoulders 96 on each of rings 40, 42 and 45 allows ring 40 to pull back on ring 42. These same shoulders also limit the total extent that compression sleeve 56 can be withdrawn.

The packer at this point is ready for movement to a new location in the pipeline with all of its components intact and (relatively) undamaged by either the lock-up or the release. This is unlike known packers which require the use of explosive valves to release the hydraulic fluid used to lock up the tool. This results in the need to remove the packers from the pipeline after each lock up for recharging. Pads 46 preferably are made from a deformable material that firmly grips the pipeline wall without causing damage thereto. These pads can be locked up at least two to three times before requiring replacement. A suitable pad material is, for example, brass which might advantageously include a minute amount of very small sized particles of an abrasive material such as powdered tungsten carbide. This provides improved frictional engagement between the pads and the pipeline wall without causing damage to the latter.

Previously, it has been necessary following the repair to tap the newly repaired section to reintroduce pipeline fluid at a pressure sufficient to reduce the delta pressure across the packers prior to release. Obviously, tapping into a new section of line is highly undesirable and there is as well the associated cost of transporting fluid and pumping equipment to the repair site. Moreover, if delta pressure is inadequately equalized, the packer will move during release Which will drag the grip inserts against the pipeline wall causing damage to both the wall and the inserts. It would be advantageous therefore if the packer itself included means selectively actuatable to provide a bypass for pipeline fluid into the repaired zone. This would allow equalization of the delta pressure between the packers facilitating a stationary release and disengagement from the pipeline wall without damaging slip or drag of the inserts.

The applicant has developed a bypass which will now be described with reference once again to FIG. 1. Fluid communication from one end to the other of packer 10 is provided by means of apertures 140 formed in drive nut 55, a flow channel 150 formed through front cap 31 and a bypass cover plate 21, an axially aligned flow channel 160 formed through housing 30 and another aligned channel 170 extending through rear collar 33.

To control the flow through the bypass, a bypass ball valve 20 is placed in flow channel 150. The valve is operated by a remotely actuatable gear motor 22 supported by a mounting plate 16. Motor 22 rotates a shaft 18 supported by bearings 19, the shaft in turn actuating a crank 17 that rotates the ball valve to selectively open and close channel 150. Prior to release of the packer, the bypass can be opened by the operator on the surface so that pipeline fluid enters the repair zone and delta pressure is equalized. The operator then closes the by-pass. The packer (or packers) can then be safely released and will remain stationary until fluid flow in the pipeline resumes.

The bypass has also been found useful in the actual positioning of the packer at a desired location. A pressure sensor 12 is provided to monitor pipeline pressure. If a pair of the present packers are used, one sensor 12 can be used to monitor pipeline pressure while the other monitors pressure in the repair zone between the packers after the bypass is opened. The operator will then know when the delta pressure has been fully equalized prior to packer release.

Sealing of the packer's various components is provided by means of appropriately positioned O-rings 175 and poly seals 176. A composite bushing 25 is provided between cap 31 and nut 55 to facilitate the nut's back and forth movement.

The present packer additionally includes an emergency release motor 4 and a coupling 8, including a separate power supply therefor, in the event that gear motor 3 or its power supply fail.

Figure 2:
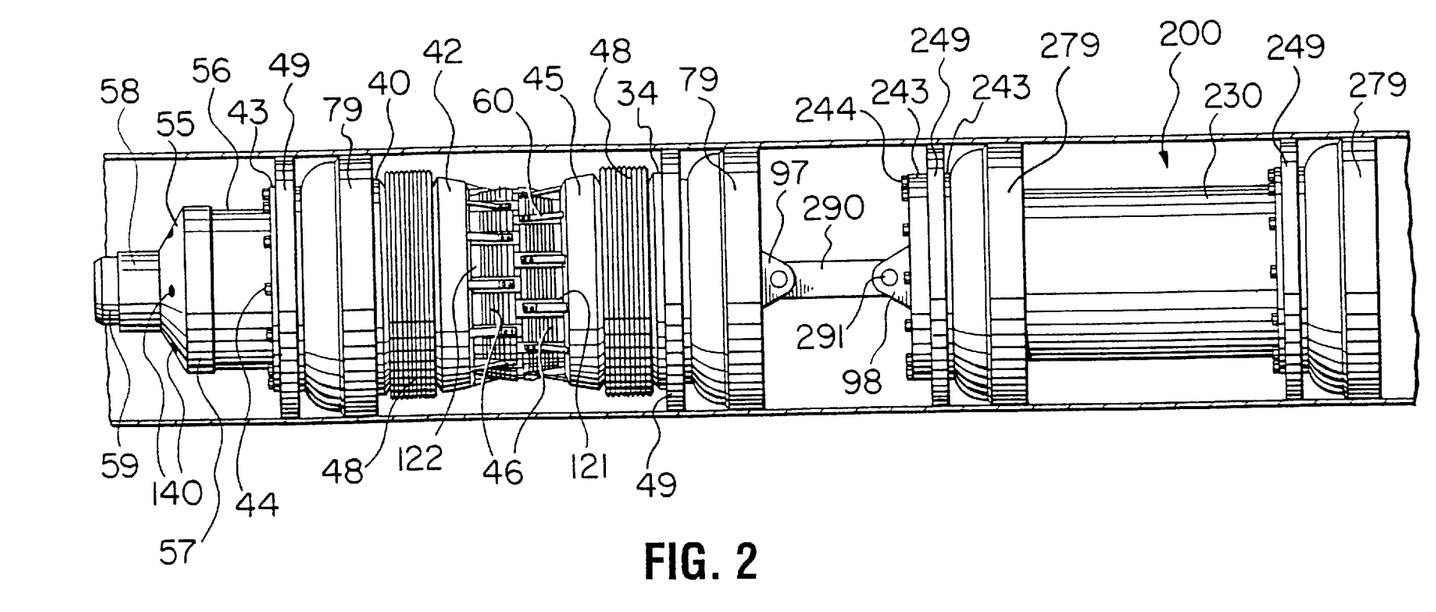
FIG. 2 is a side elevational exterior view of the packer of FIG. 1.

With reference to FIG. 2, the power supply for gear motor 3 is a battery pack (not shown) housed within a separate battery module 200. Module 200, like packer 10, comprises a housing 230 slidably supported for movement in the pipeline in tandem with the packer by a pair of spaced apart polyurethane bi-directional discs 249 and an associated pair of polyurethane cup seals 279 provided adjacent the opposite ends of the housing. Clamp rings 243 and fasteners 244 are used in the manner described above with respect to the packer to connect the discs 249 and seals 279 to housing 230. The battery module also includes a hitch 98 for connection to packer 10 via a conduit 290 pivotally connected to hitches 97 and 98 by means of, for example, pivot pins 291. Conduit 290 provides a protected passage for power and control cables, etc. extending between the battery pack and the various motors and other electrically actuated components of packer 10. The pivotable connection between the conduit and hitches 97 and 98 also allows for articulation of the module relative to the packer assembly which is important so that the present tool can more easily negotiate bends in the pipeline. In this regard, the diameter of the present tool will obviously vary according to pipeline diameter. Moreover, the configuration of the packer as described above is intended to minimize its length so that it may negotiate a bend having a centre line radius of as little as three times the nominal pipeline diameter.

Figure 3:
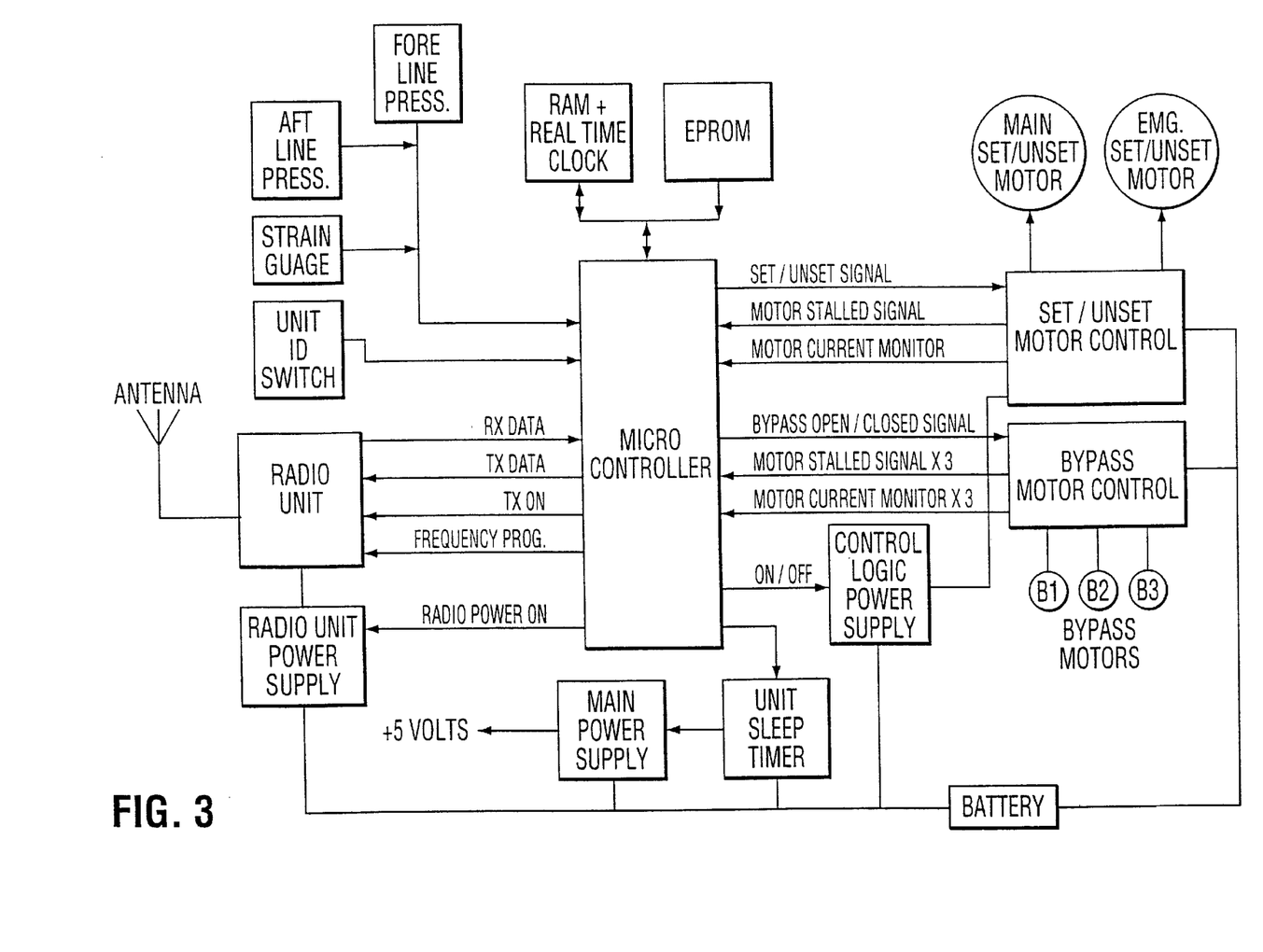
FIG. 3 is a block diagram electrical schematic for the present packer.
Figure 4:
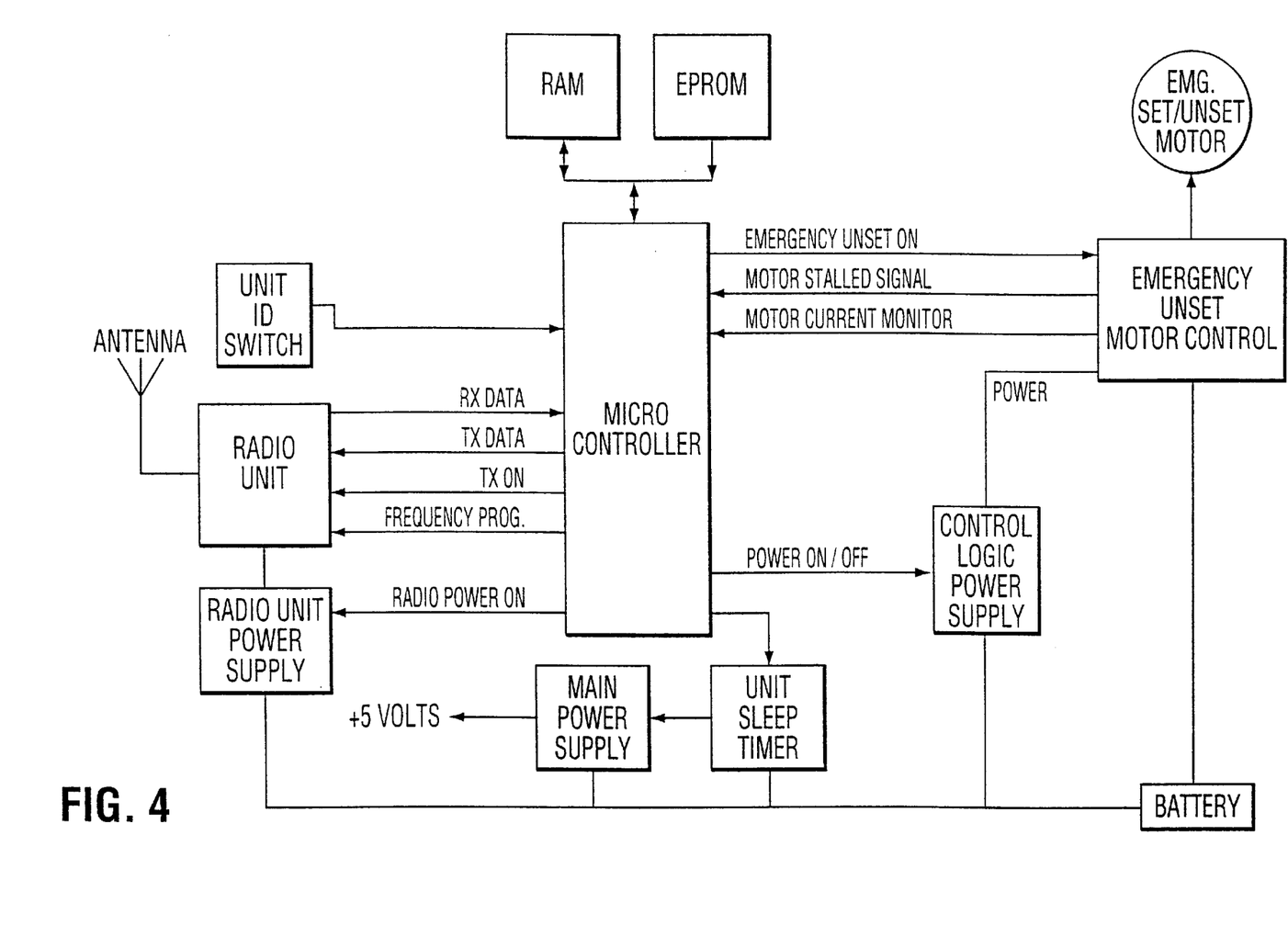
FIG. 4 is a block diagram electrical schematic for the energizing release mechanism of the packer.
Figure 5:
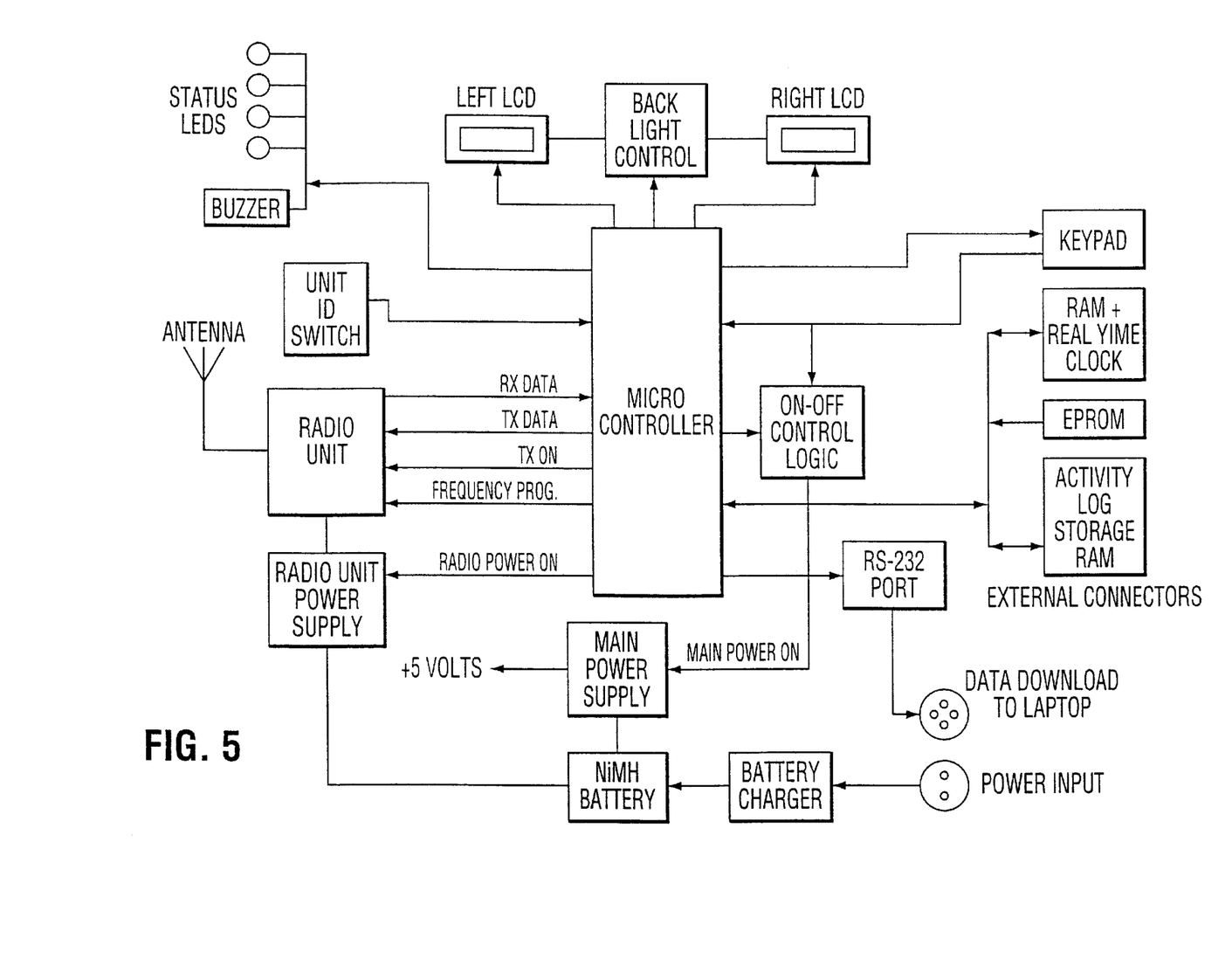
FIG. 5 is a block diagram electrical schematic for the surface control unit for the packer.

FIGS. 3, 4 and 5 are block diagram electrical schematics for packer 10, its emergency release mechanism and for the operator-actuated surface controller for the packer.

The above-described embodiments of the present invention are meant to be illustrative of preferred embodiments of the present invention and are not intended to limit the scope of the present invention. Various modifications, which would be readily apparent to one skilled in the art, are intended to be within the scope of the present invention. The only limitations to the scope of the present invention are set out in the following appended claims.

I claim:

1. A braking apparatus for locking a pipeline isolation tool used to plug a pipeline at a predetermined location against the pressure of fluid in said pipeline, said tool including a housing adapted for movement through said pipeline and for supporting said braking apparatus, comprising:

a plurality of gripping means disposed about said housing for frictionally engaging an inner surface of said pipeline to lock said tool in a predetermined location in said pipeline;

support means to independently support at least respective ones of said gripping means so that first and second portions of said gripping means are axially spaced apart in the longitudinal direction of said housing;

setting means actuatable for moving said support means between a first position wherein said gripping means are disengaged from said inner surface and a second position in which said gripping means engage said surface for locking of said tool in said predetermined location; and drive means for actuation of said setting means for selective movement of said gripping means between said first and second positions thereof.

2. The apparatus of claim 1 wherein said support means comprise a plurality of lever means each of which is aligned longitudinally with said housing and spaced circumferentially thereabout in side-by-side relationship, each said lever means supporting thereon at least a respective one of said gripping means.

3. The apparatus of claim 2 wherein adjacent ones of said lever means are oppositely aligned relative to opposite ends of said housing.

4. The apparatus of claim 3 wherein said setting means comprise first and second spaced apart rings disposed annularly about said housing with said lever means disposed therebetween, said rings being relatively moveable towards and away from one another in response to actuation of said drive means for moving said gripping means between said first and second positions thereof.

5. The apparatus of claim 4 wherein said lever means supporting said first portion of said gripping means are pivotally connected at one end thereof to one of said first and second rings, and said lever means supporting said second portion of said gripping means are pivotally connected at one end thereof to the other of said first and second rings.

6. The apparatus of claim 5 wherein the ends of said lever means opposite to said ends thereof pivotally connected to said first and second rings abut the other of said first and second rings in wedging relationship thereto, so that as said first and second rings move relatively towards one another, said ends of said lever means in wedging relation thereto are moved towards said inner surface until said gripping means are in said second position thereof.

7. The apparatus of claim 6 wherein, when said gripping means are in said second position thereof, said gripping means are wedged compressively into contact with said inner surface such that pressure acting on either end of said housing will maintain either or both of said first and second portions of said gripping means in said second position thereof.

8. The apparatus of claim 7 wherein said lever means each comprise a link portion and a head portion pivotally connected to one end of said link portion, the other end of said link portion being pivotally connected to one of said first and second rings, said gripping means being removably connected to said head portion in opposed relationship to said inner surface.

9. The apparatus of claim 8 wherein said head portion includes wedging surfaces adapted to cooperate with opposed wedging surfaces on the respective one of said first and second rings in abutting relationship thereto for movement of said head portion towards said inner wall as said first and second rings move relatively towards one another.

10. The apparatus of claim 9 wherein each of said rings includes at least first and second contiguous wedging surfaces, said first wedging surface being at a relatively steep angle to the longitudinal axis of said housing for relatively rapid movement of said head portion towards said inner surface, and said second wedging surface being at a relatively shallow angle to said longitudinal axis and being adapted to compound the wedged compressive contact between said gripping means and said inner surface.

11. The apparatus of claim 10 wherein the angle of said first wedging surface relative to said longitudinal axis is in the range of 60° to 75° and the angle of said second wedging surface relative to said longitudinal axis is in the range of 5° to 15°.

12. The apparatus of claim 10 including return means for positively returning said lever means into said first position thereof as said first and second rings move relatively away from one another.

13. The apparatus of claim 12 wherein said gripping means comprise replaceable pads of a deformable metal material relatively softer compared to the hardness of said inner surface.

14. The apparatus of claim 13 wherein said pads are made of brass.

15. The apparatus of claim 14 wherein said brass includes therein a predetermined amount of granular material for improved frictional contact between said pads and said inner wall.

16. A sealing system to prevent leakage of fluid around an isolation tool used to plug a pipeline at a predetermined location, said system comprising:

at least first and second resilient sealing members disposed annularly about said tool, said first and second members being axially spaced apart in the longitudinal direction of said tool and being radially expandable into fluid sealing contact with an inner surface of said pipeline;

seal expanding means selectively actuatable to radially expand said sealing members into fluid sealing contact with said inner pipeline surface; and drive means for selective actuation of said seal expanding means.

17. The apparatus of claim 16 wherein said seal expanding means comprise at least first and second pairs of wedging rings disposed annularly about said tool with at least one of said sealing members being disposed between the wedging rings of each said pair thereof, the wedging rings of each said pair being relatively movable towards and away from one another in response to actuation of said drive means for expansion and contraction of said sealing members.

18. The apparatus of claim 17 wherein said sealing members include wedging surfaces adapted to cooperate with opposed wedging surfaces on said wedging rings for expansion of said sealing member as said wedging rings of each pair thereof move toward one another and for contraction of said sealing members as said wedging rings move apart from one another.

19. The apparatus of claim 18 wherein said isolation tool additionally includes braking means disposed between said at least first and second sealing members, said braking means being adapted to frictionally engage said inner surface to lock said tool in said pipeline at a predetermined location against the pressure of fluid in said pipeline, such that said sealing members seal said braking means from pipeline fluid exerting pressure from either end of said tool.

20. The apparatus of claim 19 wherein said braking means comprise a plurality of gripping means disposed about said tool for frictionally engaging the inner surface of said pipeline to lock said tool in said predetermined location thereof, support means to independently support at least respective ones of said gripping means so that first and second portions of said gripping means are axially spaced apart in the longitudinal direction of said tool, setting means actuatable for moving said support means between a first position wherein said gripping means are disengaged from said inner surface and a second position in which said gripping means engage said inner surface for locking of said tool in said predetermined location and drive means for actuation of said setting means for selective movement of said gripping means between said first and second positions thereof.

21. The apparatus of claim 20 wherein said setting means comprise first and second spaced apart rings disposed annularly about said tool with said support means disposed therebetween, said rings being relatively movable towards and away from one another in response to actuation of said drive means for moving said gripping means between said first and second positions thereof.

22. The apparatus of claim 21 wherein said first ring and one of said wedging rings of said first pair thereof are the same component and wherein said second ring and one of said wedging rings of said second pair thereof are similarly the same component.

23. In a pipeline isolation tool for plugging a pipeline at a predetermined location, said tool including a housing adapted for movement through the pipeline, sealing means disposed annularly about said housing and being expandable into fluid sealing contact with the pipeline inner wall and braking means adapted to frictionally engage the inner pipeline wall to hold the tool in a predetermined location against the pressure of fluid in the pipeline, the improvement comprising a fluid bypass, said bypass including:

a flow channel formed through said housing for the flow of pipeline fluid from one end of said housing to the other;

valve means selectively actuatable to open and close said flow channel; and actuating means responsive to an input for selectively opening said valve to permit said flow of fluid and for closing of said valve to prevent said flow of fluid, wherein said bypass may be used to adjust or equalize the pressure of pipeline fluid acting across said housing.

24. The apparatus of claim 23 wherein said actuating means include a motor operatively connected to said valve means for the opening and closing thereof in response to said input.

25. In a pipeline isolation tool for plugging a pipeline at a predetermined location, said tool including a housing adapted for movement through the pipeline, sealing means disposed annularly about said housing and being expandable into fluid sealing contact with the pipeline inner wall and braking means adapted to frictionally engage the inner pipeline wall to hold the tool in a predetermined location against the pressure of fluid in the pipeline, the improvement comprising an electromechanical drive system, said system comprising:

a threaded driven member rotatable in the clockwise and counter-clockwise directions about its longitudinal axis;

a prime mover operatively connected to said driven member for rotation thereof; and means operatively associated with said driven member and threadedly connected thereto to move axially back and forth relative to said housing in response to clockwise and counter-clockwise rotation of said driven member, such that axial movement of said means in one direction actuates said sealing and braking means when said tool is to be held in a predetermined position thereof and axial movement of said means in the opposite direction releases said sealing and braking means so that said tool is movable relative to said pipeline, whereby said tool is adapted to plug said pipeline a plurality of times without having to withdraw said tool from said pipeline between said times.

26. The apparatus of claim 25 additionally including a secondary mover to selectively rotate said driven member in the event of failure of said prime mover.

27. A pipeline isolation tool for plugging a pipeline at a predetermined location, comprising:

housing means adapted for movement through said pipeline, said housing having first and second ends;

sealing means disposed annularly about said housing, said sealing means being radially expandable into fluid sealing contact with an inner wall of the pipeline; and a plurality of braking members, said braking members comprising a plurality of gripping means for frictionally engaging the inner wall of said pipeline to lock said isolation too in said predetermined position thereof against fluid pressure in said pipeline, and support means to independently support at least respective ones of said gripping means so that first and second portions of said gripping means are axially spaced apart in the longitudinal direction of said housing, said braking members being selectively and repetitively movable between a first position in which said gripping means are disengaged from said inner wall and a second position in which said gripping means engage said inner wall.

28. The isolation tool of claim 27 wherein said braking means comprise a plurality of levers aligned longitudinally with said housing and spaced circumferentially thereabout, adjacent ones of said levers being oppositely aligned relative to said first and second ends of said housing.

29. The isolation tool of claim 28 wherein each of said levers supports adjacent one end thereof at least a respective one of said gripping means, such that with said levers in said second position thereof, said gripping means engage said inner wall in a staggered array.

30. The isolation tool of claim 29 wherein said housing includes a fluid bypass formed therethrough, said bypass being selectively actuatable to allow fluid in said pipeline to flow through said housing for adjustment or equalization of said fluid pressure across said housing.

31. A pipeline isolation tool for plugging a pipeline at a predetermined location, comprising:

housing means adapted for movement through said pipeline, said housing having first and second ends;

sealing means comprising at least first and second resilient sealing members disposed annularly about said housing, said first and second members being axially spaced apart in the longitudinal direction of said housing and being radially expandable into fluid sealing contact with an inner surface of said pipeline;

seal expanding means selectively actuatable to radially expand said sealing members into fluid sealing contact with said inner surface;

braking means for locking said tool in said predetermined location, said braking means including a plurality of gripping means disposed about said housing for frictionally engaging said inner surface to lock said tool in said predetermined location, support means to independently support at least respective ones of said gripping means so that first and second sub groupings of said gripping means are axially spaced apart in the longitudinal direction of said housing and setting means actuatable for moving said support means between a first position wherein said gripping means are disengaged from said inner surface and a second position in which said gripping means engage said surface for locking of said tool in said predetermined location; and drive means for selective actuation of said setting means for movement of said gripping means between said first and second positions thereof and of said seal expanding means.

32. The tool of claim 31 wherein said braking means are disposed between said at least first and second sealing members.

33. The apparatus of claim 32 wherein said support means comprise a plurality of lever means each of which is aligned longitudinally with said housing and spaced circumferentially thereabout in side-by-side relationship, each said lever means supporting thereon at least a respective one of said gripping means.

34. The apparatus of claim 33 wherein adjacent ones of said lever means are oppositely aligned relative to opposite ends of said housing.

35. The apparatus of claim 34 wherein said setting means comprise first and second spaced apart rings disposed annularly about said housing with said lever means disposed therebetween, said rings being relatively moveable towards and away from one another in response to actuation of said drive means for moving said gripping means between said first and second positions thereof.

36. The apparatus of claim 35 wherein said lever means supporting said first portion of said gripping means are pivotally connected at one end thereof to one of said first and second rings, and said lever means supporting said second portion of said gripping means are pivotally connected at one end thereof to the other of said first and second rings.

37. The apparatus of claim 36 wherein the ends of said lever means opposite to said ends thereof pivotally connected to said first and second rings abut the other of said first and second rings in wedging relationship thereto, so that as said first and second rings move relatively towards one another, said ends of said lever means in wedging relation thereto are moved towards said inner surface until said gripping means are in said second position thereof.

38. The apparatus of claim 37 wherein, when said gripping means are in said second position thereof, said gripping means are wedged compressively into contact with said inner surface such that pressure acting on either end of said housing will maintain either or both of said first and second portions of said gripping means in said second position thereof.

39. The apparatus of claim 38 wherein said lever means each comprise a link portion and a head portion pivotally connected to one end of said link portion, the other end of said link portion being pivotally connected to one of said first and second rings, said gripping means being removably connected to said head portion in opposed relationship to said inner surface.

40. The apparatus of claim 39 wherein said head portion includes wedging surfaces adapted to cooperate with opposed wedging surfaces on the respective one of said first and second rings in abutting relationship thereto for movement of said head portion towards said inner wall as said first and second rings move relatively towards one another.

41. The apparatus of claim 40 wherein each of said rings includes at least first and second contiguous wedging surfaces, said first wedging surface being at a relatively steep angle to the longitudinal axis of said housing for relatively rapid movement of said head portion towards said inner surface, and said second wedging surface being at a relatively shallow angle to said longitudinal axis and being adapted to compound the wedged compressive contact between said gripping means and said inner surface.

42. The apparatus of claim 41 wherein said seal expanding means comprise at least first and second pairs of wedging rings disposed annularly about said tool with at least one of said sealing members being disposed between the wedging rings of each said pair thereof, the wedging rings of each said pair being relatively movable towards and away from one another in response to actuation of said drive means for expansion and contraction of said sealing members.

43. The apparatus of claim 42 wherein said first ring and one of said wedging rings of said first pair thereof are the same component and wherein said second ring and one of said wedging rings of said second pair thereof are similarly the same component.

44. The apparatus of claim 31 wherein said drive means include a threaded driven member rotatable in the clockwise and counter-clockwise directions about its longitudinal axis, a prime mover operatively connected to said driven member for rotation thereof and means operatively associated with said driven member and threadedly connected thereto to move axially back and forth relative to said housing in response to clockwise and counter-clockwise rotation of said driven member, such that axial movement of said means in one direction actuates said sealing and braking means when said tool is to be held in said predetermined location and axial movement of said means in the opposite direction releases said sealing and braking means so that said tool is movable relative to said pipeline.

45. The apparatus of claim 44 further including auxiliary means for selective rotation of said driven member in the event of failure of said prime mover.

46. The apparatus of claim 31 additionally including a fluid bypass provided in said tool, said bypass including a flow channel formed through said housing for the flow of fluid from one end of said housing to the other, valve means selectively actuatable to open and close said flow channel and actuating means responsive to an input for selectively opening said valve to permit said flow of fluid and for closing said valve to prevent said flow of fluid, wherein said bypass may be used to adjust or equalize the pressure of fluid acting across said housing.

47. The apparatus of claim 46 wherein said actuating means include a motor operatively connected to said valve means for the opening and closing thereof in response to said input.

* * * * *

UNITED STATES PATENT AND TRADEMARK OFFICE
CERTIFICATE OF CORRECTION

PATENT NO. : 5,924,454
DATED : July 20, 1999
INVENTOR(S) : Dyck et al.

It is certified that error appears in the above-identified patent and that said Letters Patent is hereby corrected as shown below:

On the Title Page, item [75], after "Edmonton," insert --Alberta--.

Column 1, line 5, before "present" insert --The--.

Column 3, line 60, after "housing" insert --,--.

Column 4, line 57, "electromechanical" should read --electro-mechanical--.

Column 5, line 46, "bidirectional" should read --bi-directional--.

Column 5, lines 56, 57, "over tightening" should read --over-tightening--.

Column 7, line 34, "Which" should read --which--.

Column 11, line 48, "electromechanical" should read --electro-mechanical--.

Column 12, line 14, "too" should read --tool--.

Signed and Sealed this

Eighth Day of February, 2000

Attest:

Q. TODD DICKINSON

*Attesting Officer*   *Commissioner of Patents and Trademarks*